United States Patent [19]
Irvin et al.

[11] Patent Number: 5,862,160
[45] Date of Patent: Jan. 19, 1999

[54] SECONDARY CHANNEL FOR COMMUNICATION NETWORKS

[75] Inventors: David R. Irvin, Raleigh; Ali S. Khayrallah, Apex, both of N.C.

[73] Assignee: Ericsson, Inc., Research Triangle Park, N.C.

[21] Appl. No.: 777,780

[22] Filed: Dec. 31, 1996

[51] Int. Cl.$^6$ .................................................. G06F 11/10
[52] U.S. Cl. ........................... 371/53; 370/522; 370/527; 370/529
[58] Field of Search .................................. 371/37.01, 53; 370/342, 450, 328, 280, 471, 522, 529, 527; 335/435, 113, 114

[56] References Cited

U.S. PATENT DOCUMENTS 5,550,809  8/1996  Bottomley et al. ...................... 370/18
5,689,568  11/1997  Laborde .................................. 380/49

OTHER PUBLICATIONS

P. E. Boudreau, W.C. Bergman and D.R. Irvin, "Performance of a Cyclic Redundancy Check and its Interaction With a Data Scrambler", IBM J. Res. Develop., vol. 38, No. 6, Nov. 1994, pp. 651–658.

*Primary Examiner*—Reba I. Elmore
*Assistant Examiner*—McDieunel Marc
*Attorney, Agent, or Firm*—Jenkens & Gilchrist, P.C.

[57] ABSTRACT

A method and an apparatus are disclosed for combining information from two sources and for separating the combined information after transmission over one physical channel. A mask which represents a specified piece of information such as a control command or logic state of an input is exclusively ORed with an encoded input signal, thereby inducing a violation of an error control code. At the receiving end of the system, each of a set of masks is exclusively ORed with the received data stream. One of the masks is the same as the mask initially combined with the encoded input signal. Accordingly, once that mask is combined with the received data stream and so indicated by the favorable outcome of an error control code check, the original encoded input as well as the specified piece of information are recreated and produced.

11 Claims, 5 Drawing Sheets

SECONDARY CHANNEL FOR COMMUNICATION NETWORKS

BACKGROUND OF THE INVENTION

1. Technical Field of the Invention

The present invention relates to digital communication systems, and in particular to systems for deriving a primary and a secondary logical channel from a common physical channel without increasing the bandwidth needed to accommodate the physical channel.

2. Description of Related Art

The purpose of a digital communication system is to enable the exchange of bit-encoded information among various electronic devices located at various places. The functions necessary to accomplish this purpose can be divided into seven groups, each group corresponding to one of the layers of a seven-layer data-communications protocol model adopted by the international standards community, as described in Section 3,1 of Data Networks by Bertsekas and Gallagher (Prentice-Hall, 1987).

The lowest layer of this model, known as the physical layer, encompasses the methods and apparatus needed to move bits from a source to a destination. These methods and apparatus include such things as transmission wires, connectors, and antennas; modulators and demodulators; and the associated electronics and components needed to communicate a bit stream between adjacent nodes in a communication network by means of fiber optics, coaxial cables, parallel conductor transmission lines, wireless radio links, or some combination of these. In this context, the resulting bitstream is called a physical channel.

Once a physical channel is established and a bitstream can be communicated between network nodes, the bits provided by the bitstream can be organized for the benefit of a user or a plurality of users, thereby providing these users with logical channels derived from the raw bit-moving capacity of the physical channel. The functions needed to accomplish this organization are generally encompassed by the higher layers of the seven-layer protocol model mentioned above.

For example, the North American telephone network includes a transmission method and format known as T1-rate service. This service moves bits between network nodes at the rate of 1.536 million bits per second (Mbps). In one use, the full capacity of the T1 physical channel can be employed to provide a single broadband channel for the benefit of a single user, for example to connect a first high-capacity computer server in a first city to a second high-capacity server in a second city. In a different situation, the capacity of the T1-rate physical channel can be subdivided by multiplexing apparats into a twenty-four channels each having a transmission capacity of 64,000 bits per second (64 Kbps). Through functions encompassed by the higher layers of the protocol model, each of these 64 Kbps channels can be configured to support a different digital conversation or application, thereby subdividing the physical channel into a plurality of logical channels.

One of the organizational functions routinely present in a data-communication network is an error-control mechanism intended to provide some degree of protection against transmission errors. Such errors typically arise from the coupling of external disturbances often called noise into the physical channel, and have the undesired effect of altering the logical state of bits as they transmit the physical channel, and thereby altering the logical state of bits delivered by one or more of the logical channels. This error-control mechanism is typically provided by the data-link-control (DLC) functions encompassed by the higher layers of the protocol model.

Under the operation of a standard DLC, a plurality of bits to be communicated are collected and grouped into a data packet. To the beginning of the packet is appended a packet header comprising flag, address, and control fields needed to enable and assist the operation of other network functions. To the end of the packet is appended a packet trailer comprising flag bits and parity bits. Together, the header, packet, and trailer is called a frame. The purpose of the parity bits carried by the frame is to provide a means of detecting the presence of any bit errors introduced into the frame during its transit across the physical channel.

One particular method of generating and processing parity bits is the cyclic redundancy check (CRC), whose operation can be envisioned most clearly as a series of multiplication and division operations among polynomials having modulo-2 coefficients in recognition of their representation of digital bits. In this representation, the contents of a partial frame (i.e., the frame excluding its header flag and its trailer) can be thought of as an N-degree polynomial, where N is the number of bits in the partial frame. This polynomial is divided by a second polynomial known as the CRC generator polynomial. On completion of the division, the resulting remainder is incorporated into the packet trailer as the parity bits, and the frame is passed to the physical channel for transmission.

Upon receipt of the frame, the receiver again computes the polynomial division, and compares the resulting remainder with the received remainder. Transmission errors are indicated by any disagreement between the remainder as conveyed by the received frame and the remainder as re-computed by the receiver.

The polynomial model as well as the limitations and capabilities inherent in CRCs derived from various generator polynomials in widespread commercial use are described more fully by Boudreau, Bergman, and Irvin, in "Performance of a cyclic redundancy check and its interaction with a data scrambler" (IBM Journal of Research and Development, vol. 38, no. 6, November 1994, pp. 651–658). From mathematical results laid out in this paper, it can be shown that current error-protection schemes often provide excess error-control capacity.

This excess error-control capacity arises from practical design constraints. For example, the number of redundancy bits provided by a commercially useful CRC is normally an integral multiple of eight, due to the byte-oriented nature of today's digital communication apparatus. Moreover, in commercial reality most useful CRC generator polynomials are chosen from a small list of accepted industry standards that provide either eight, sixteen, or thirty-two redundancy bits. For this reason, a system architect might select a 32-bit CRC, which might have an abundance of capacity relative to the task at hand, rather than select a 16-bit CRC whose adequacy might be questionable. Thus, the inflexibility of granularity often leads to a wasteful excess of error-control capacity.

In the problem at hand, excess CRC capacity has important commercial considerations that follow from the nature of the DLC of which the CRC is part. In addition to its error-control functions, the DLC typically controls access to the physical transmission medium, and in this sense imposes the logical channel upon the physical channel. In doing so, the DLC also imposes all of the limits inherent in its predetermined frame structure, and in particular thereby constrains transmission efficiency by cementing-in excess CRC capacity.

The DLC's cementing-in of excess CRC capacity has adverse economic consequences to the end-user of the communication system. If the end-user has a need for a small amount of additional transmission capacity, for example to implement a secondary channel for the purpose of carrying network-management information or for extending the reach of an exhausted control field, that user is required to procure additional physical-channel bandwidth from a common carrier, thereby incurring a penalty in complexity and in operating cost. Such problems become particularly acute when the physical channel is provided by a wireless communication network such as a cellular or satellite network, where the limitations imposed by regulatory agencies to conserve the finite electromagnetic spectrum may make the purchase of additional transmission capacity prohibitively expensive.

Thus, there is a need to enable the DLC to recapture excess error-control capacity and apply this recaptured capacity toward providing a secondary logical channel over which the end-user or the common carrier itself may communicate incidental information without increasing the bandwidth needed to accommodate the physical channel, and in this way to conserve spectral resources in a wireless communication system or to minimize wasteful expenditures in a wireline communication system.

SUMMARY OF THE INVENTION

A method and an apparatus are provided within a communications network for creating two logical channels and for transmitting information from at least two sources on only one physical communication channel. To achieve this result, a data input pattern is logically combined with a data frame at the transmission end. The data input pattern and data frame are separated at the receiving end. Error control coding is used to determine whether two sets of signals have been combined and to reconstruct the two original sets of signals.

More specifically, a specified data mask which represents a specified data input pattern is exclusively ORed (XORed) with a data stream before transmission to induce an error-control-code violation. At the receiving end, if the calculated and received parity bits differ, at least one specified mask is XoRed with the received data stream. In general, the receiving system contains a list of masks that are the same as those which are in the transmitting system. The received parity bits are again compared to the calculated parity bits for the XORed product of the data frame and mask (XOR product).

The process is repeated for every specified mask stored within the receiver. If the received parity bits differ from the computed parity bits, the receiving system assumes that a transmission error has occurred. If the received parity bits agree with the computed parity bits, then the receiving system concludes that the input data frame has been recreated. The reason for this conclusion is that the XORed product of the data frame and the mask is the original data frame. Moreover, the mask used to recreate the original data frame is the same as the mask used at the transmission end of the communication link. Accordingly, the receiving system also can determine the input data bit pattern, because the mask, by definition, represents a specified signal data bit pattern. Therefore, the receiver is also able to reconstruct the data that originated from the second source.

The elements of the inventive system include, at the transmission end of the communication link, a store, an error protection encoder and a logic unit. The store includes at least one data mask to represent at least one possible input data bit pattern. The error protection encoder is for generating a specified error control code. The logic unit is for combining a select mask with a data frame. The invention also includes, at the receiving end, a store, an error protection decoder and a logic unit. The store includes at least one mask which represents at least one possible input data bit stream pattern. The logic unit is for combining the mask with the received data frame. The error protection decoder is for processing the received signal to determine the parity bits for the received signal and, assuming no errors, for recreating the input data bit pattern and the input data frame.

The inventive method includes logically XORing a data frame with a mask bit pattern. The XOR product is then transmitted. At the receiving end, at least one mask bit pattern is XORed with the received data frame. The parity bits are then calculated for the XOR product. If the calculated parity bits and received parity bits match, the original data frame is output. Additionally, a specified data bit pattern corresponding to the mask is output. If the parity bits do not match, the process is repeated until all stored masks have been XORed with the received data frame. A transmission error signal is generated only if a match of parity bits is not found for any of the XOR products of the stored masks and the received data frame. Thus, information which would otherwise require the use of a second physical channel has been transmitted over a second logical channel instead, thereby reducing the amount of necessary communication resources.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
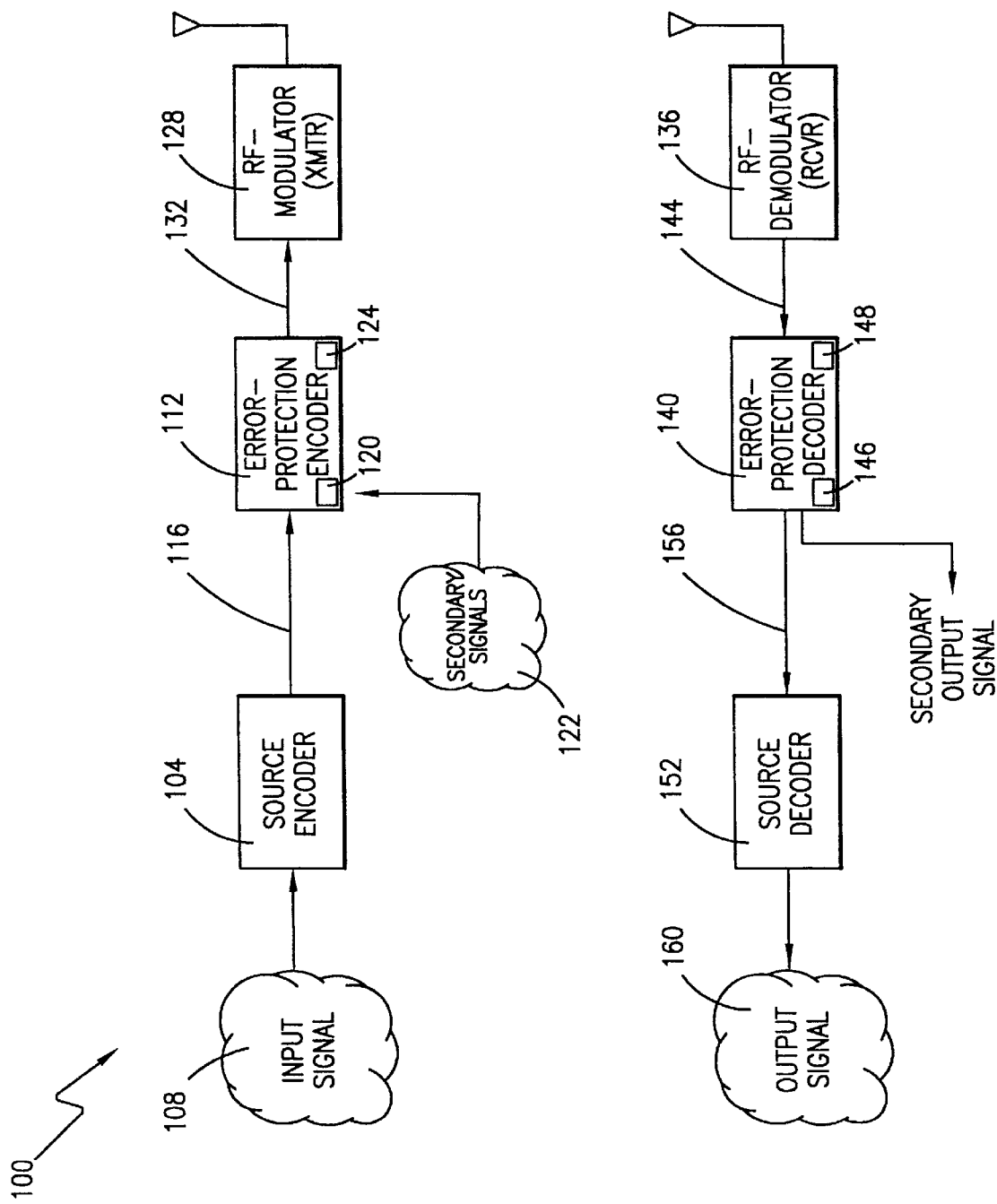
FIG. 1 is a functional block diagram which illustrates an embodiment of the invention wherein there is shown a transmitter and a receiver of a communication network for transmitting two logical channels over one physical channel.

FIG. 1 is a functional block diagram which illustrates a transmitting system and a receiving system of a communication network for transmitting a primary and a secondary logical channel over one physical channel. Referring now to FIG. 1, communication system 100 includes a source encoder 104 for encoding a signal 108 which is to be transmitted over the primary channel. By way of example, signal 108 can be an analog signal representing sound detected by a microphone. Source encoder 104 encodes signal 108 in a conventional manner. Source encoder 104 is coupled to error protection encoder 112 by line 116. Error protection encoder 112 functions, generally, to generate parity bits to the transmitted with an encoded signal so that a receiver may determine if an error-control-code violation is evident. Error protection encoder 112 also includes a mask selector 120 and a logic circuit 124. Mask selector 120 is for selecting a mask, or data bit pattern, which can be used for conveying additional information on the secondary channel. Logic circuit 124 is for logically combining the mask produced by mask selector 120 with the encoded signal produced by source encoder 104. Error protection encoder 112 is connected to RF modulator 128 by line 132. RF modulator 128 is for transmitting a data frame received over line 132. It is understood that this invention may be used within other types of communication mediums including wireline networks, T1 lines, fiber-optic cabling, etc.

Returning to communication system 100 of FIG. 1, an RF demodulator 136 is shown. RF demodulator 136 is for receiving the data frame transmitted by RF modulator 128, RF demodulator is connected to error protection decoder 140 by line 144 and transmits demodulated signals thereto. Error protein decoder 140 is, generally, for analyzing the parity bits received within the demodulated signals and for determining if an error-control-code violation is evident. Error protection decoder 140 also includes, however, a mask selector circuit 146 and a logic circuit 148. Mask selector circuit 146 is for selecting a mask, or data bit pattern, which is to be combined with a data portion of the demodulated signals by logic circuit 148. In general, mask selector circuit 146 and logic circuit 148 are for recreating the encoded signal (primary signal) transmitted by source encoder 104 to error protection encoder 112 over line 116. Mask selector circuit 146 and logic circuit 148 are also for determining what additional information was conveyed on the secondary logical channel (primary physical channel) transmitted by RF modulator 128. Error protection decoder 140 is also connected to source decoder 152 by line 156 and produces the recreated primary signal thereto. Source decoder 152 is for decoding the recreated primary signal to create the output signal 160.

In operation, communication system 100 receives input signal 108 for transmission. More specifically, source encoder 104 encodes input signal 108 to convert input signal 108 into a form suitable for transmission. Once input signal 108 has been encoded and transmitted to error protection encoder 112, error protection encoder calculates party bits for the encoded signal. For example, error protection encoder 112 produces parity bits according to a CRC code, according to the preferred embodiment. Certainly, other types of error codes could be used. For example, error protection encoder 112 could calculate parity bits according to The Bose Chaudhuri Hocquenghem (BCH) Code or any number of equivalent codes well known to those familiar in the art.

Error protection encoder 112 uses logic circuit 124 to combine the source encoded signal and a specified mask or data bit pattern. Error protection encoder includes a store within mask selector 120 for storing at least one mask. Each mask represents a specified signal, event, or message which is to be conveyed at select times by the secondary channel. By way of example, error protection encoder 112 may also receive secondary signals 122 from a second source (not explicitly shown) which are to be conveyed along with the encoded signal received from source encoder 104. If, for example, the secondary signals comprise two lines having four possible input states (e.g., 00, 01, 10 and 11), the mask store contains at least three masks to represent the three input states which have a value greater than zero. The second set of signals, can be formed either of signals generated by an external source or signals generated internally. For example, the secondary signals could comprise control or status signals generated by a CPU.

In the preferred embodiment, a set of mask patterns is selected to reduce the likelihood of having an error pass undetected. For example, the input state of "01" may be represented by a mask bit pattern defined as "0110100111100011". For this example, the mask bit pattern represents a pattern which is substantially dissimilar to a codeword formed by the combination of the primary signal and the parity bits. A mask pattern is selected which, when typical transmission errors occur, does not substantially increase the likelihood reduces the likelihood of having an error go undetected.

More specifically, a mask bit pattern is selected which will not equal a codeword if a few bits are received in a logical state opposite to that which was transmitted. In general, a mask pattern is selected through an iterative trial and error process. In such a selection process, proposed mask patterns are rejected or accepted after being compared to the specified set of codewords.

Once the error protection encoder has combined the selected mask and the encoded input signal to form a combined signal, the combined signal is transmitted along with the error control code to the RF modulator 128. RF demodulator 136 then receives and demodulates the signal transmitted by RF modulator 128. RF demodulator then conveys the demodulated signal to error protection decoder 140. Error protection decoder 140 determines whether a mask was combined with the primary signal and, if so, the informational content being conveyed along with the primary signal. If an error occurs during transmission, however, none of the calculated and received error codes will match. Additionally, error protection decoder 140 will not be able to recreate the primary signal or extract the conveyed information which relates to the mask.

More specifically, error protection decoder 140 examines the received parity bits and compares them to calculated parity bits that are based upon the received data. If no mask pattern was combined with the primary signal and if no transmission error occurred, the calculated and received parity bits should be equal. If, on the other hand, a mask was combined with the primary signal or if a transmission error occurred, the calculated parity bits will not equal the received parity bits. Accordingly, error protection decoder 140 logically combines each mask stored in the receiving system with the received signal until the calculated and received parity bits match. Assuming that no transmission error occurred, the logical combination of one of the mask patterns with the received data stream results in the recreation of the original primary signal. Once the original primary signal is recreated, the calculated parity bits and the received parity bits will be equal. This result follows because, if A XOR B=C, then C XOR B=A. Accordingly, once the same mask is logically combined by an exclusive OR function (XOR) with the received data stream, the primary signal has been recreated.

At this point, error protection decoder 140 has recreated the original primary signal and can transmit the recreated signal to source decoder 152 over line 156. Additionally, error protection decoder 140 can determine which mask pattern was used to reconstruct the primary signal. Error protection decoder 140 is also able to output the same data bit pattern which caused the specified mask to be selected. This occurs because each mask represents one event or data bit pattern.

Figure 2:
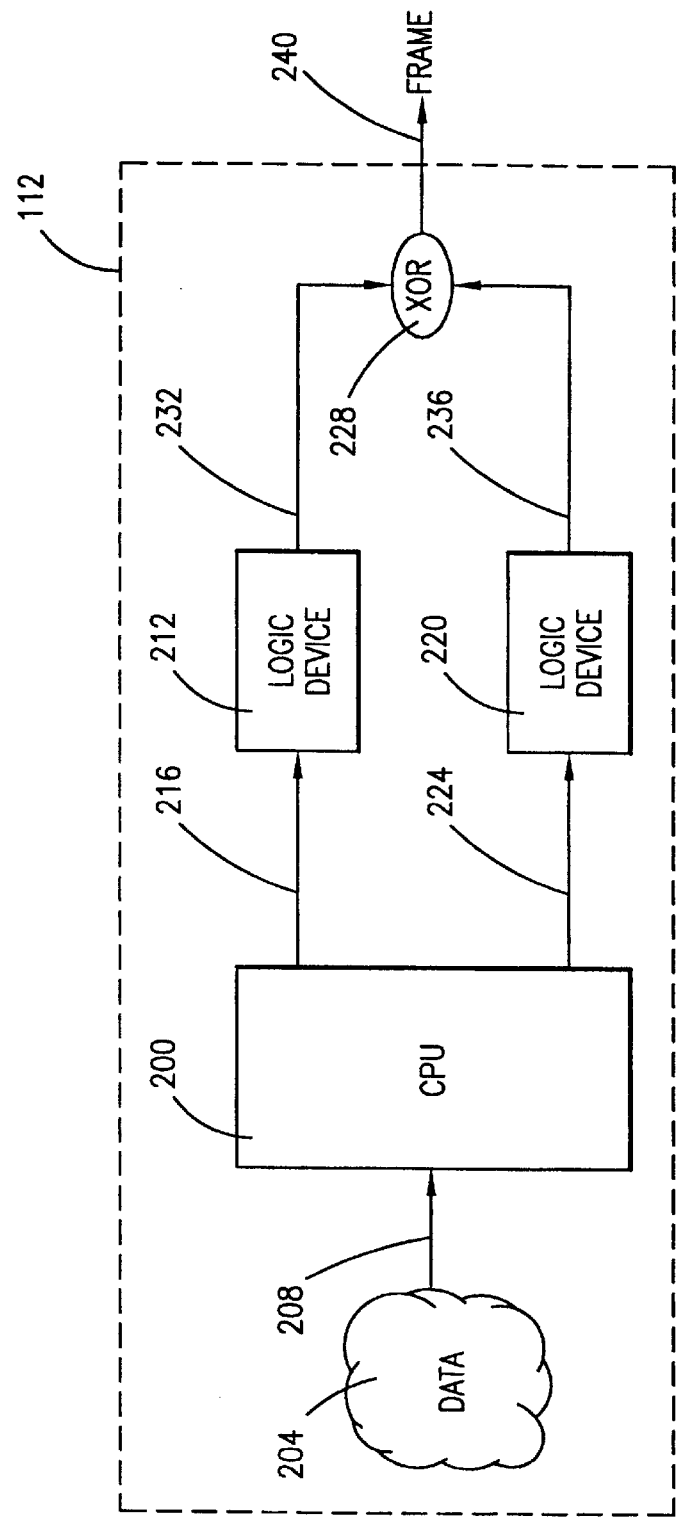
FIG. 2 is a functional block diagram of an error protection encoder according to a preferred embodiment of the invention.

FIG. 2 is a functional block diagram of an error protection encoder according to a preferred embodiment of the invention. Referring now to FIG. 2, there is shown one embodiment of error protection encoder 112 of FIG. 1. CPU 200 is coupled to receive data 204 over line 208. For the embodiment shown, CPU 200 is connected to logic device 212 by line 216. Line 216 forms a primary data channel. Accordingly, data 204 is transmitted by CPU 200 over line 216 to logic device 212.

Logic device 212 is for generating and appending CRC bits. Again, a conventional type of error detection system may be employed. For the embodiment shown in FIG. 2, CRC error checking is performed in accordance with the preferred embodiment of the invention. Specifically, CPU 200 is also connected to logic device 220 over line 224. Line 224 is a secondary data channel. Line 224 may be formed of discrete lines or of any one of many different types of data buses.

Logic device 220 is for storing a list of masks, one mask for each possible data state received over line 224. Accordingly, logic device 220 is also for selecting one of the list of masks according to the data state received from line 224. The data state or data bit pattern received from line 224 can be signals which originated in CPU 200 or which originated external to CPU 200.

Both logic device 212 and logic device 220 are also connected to exclusive OR circuit 228 by lines 232 and 236, respectively. Exclusive OR circuit 228 logically combines the signals received on lines 232 and 236 to produce a data frame having an induced violation of the error control code for transmission on line 240. The system of FIG. 2, therefore, combines the information carried on the secondary data channel with the information carried on the primary data channel. Thus, the signals from both channels may be conveyed over one data channel, represented herein by line 240.

In operation, the data transmitted by CPU 200 over line 224 will represent any number of select events. By way of example, each logic state of the signals transmitted on line 224 represents a specified control signal or command associated with the data being transmitted on the secondary data channel. Alternatively, each logic state can represent an error state, status signal, or other data signal. Thus, as logic device 212 receives the primary data over line 216, logic device 220 receives the various secondary data inputs on line 224. Logic device 220 generates the mask pattern according to the state of the data received on line 224 and transmits a corresponding mask to exclusive OR circuit 228. At the same time, logic device 212 transmits the primary data channel information with appended CRC bits to exclusive OR circuit 228 over line 232. Exclusive OR circuit 228 then combines the data received on the two lines 232 and 236 to produce one channel of data on line 240 wherein the data frame has an induced error-control-code violation corresponding to the secondary data input.

Figure 3:
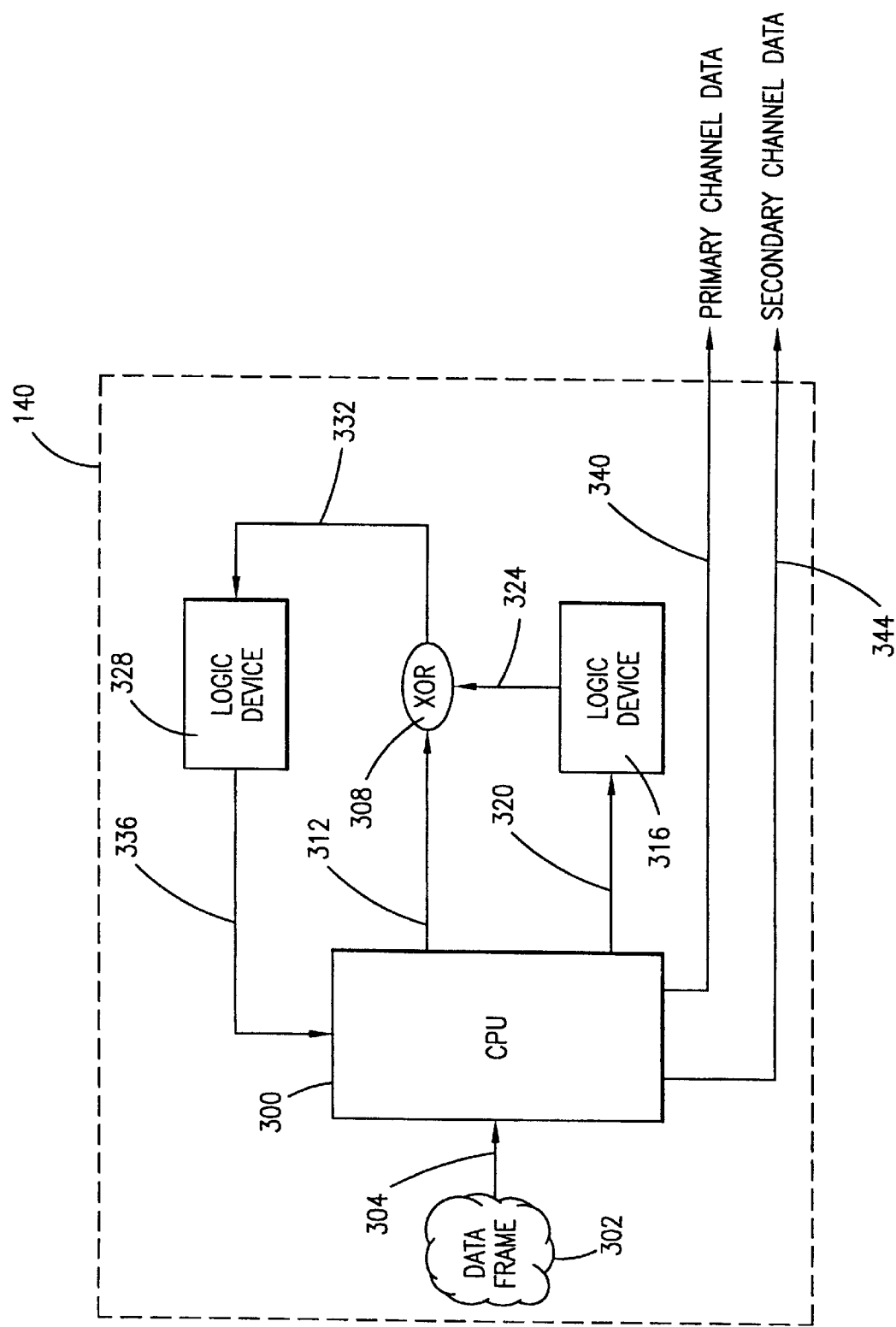
FIG. 3 is a functional block diagram of an error protection decoder according to the preferred embodiment of the invention.

FIG. 3 is a functional block diagram of an error protection decoder according to the preferred embodiment of the invention. Referring now to FIG. 3, CPU 300 receives data frame 302 on line 304. As shown, CPU 300 is connected to exclusive OR circuit 308 by line 312 and to logic device 316 by line 320. Generally CPU 300 transmits the received data frame over line 312 to exclusive OR circuit 308 and control signals over line 320 to logic device 316. Logic device 316 selects a mask, and is connected to transmit the select mask responsive to the received control signal to exclusive OR circuit 308 over line 324. The output of exclusive OR circuit 308 is connected to logic device 328 by line 332. The output of logic device 328, in turn, is connected to CPU 300 over line 336. Exclusive OR circuit 308 is for logically combining the data frame received on line 312 with a mask received on line 324. Logic device 328 is for calculating and comparing parity bits. By way of example, logic device 328, in the preferred embodiment, performs CRC error checking.

In operation, CPU 300 receives data frame 302 on line 304 and transmits data frame 302 to exclusive OR circuit 308 over line 312. Initially, data frame 302 is allowed to pass through exclusive OR circuit 308 unchanged. This allows logic device 328 to perform its error checking on the received data frame 302. Accordingly, if no transmission error has occurred and if no violation of the error control code has been induced by combining a mask with the primary signal at the transmission of the system, CPU 300 may conclude the same and produce the primary channel data output without combining the data frame with the various masks in logic device 316.

To allow data frame 302 to pass through exclusive OR circuit 308 unchanged, CPU 300 does not, in the preferred embodiment, transmit a control signal to logic device 316 on line 320 the first time CPU 300 transmits the received data frame 302 to exclusive OR circuit 308. Accordingly, logic device 316 does not output a mask to exclusive OR circuit 308. In an alternate embodiment, an initial control signal is transmitted on line 320 which causes logic device 316 to stop transmission over its output line 324. In yet another embodiment, the control signal transmitted on line 320 causes logic device 316 to transmit a data bit pattern which, when it is logically combined with the data stream received by exclusive OR circuit 308 on line 312, does not change the values of the data frames received on line 312. By way of example, logic device 316 can transmit a mask pattern of all zeros.

Once logic device 328 receives the output from exclusive OR circuit 308, it calculates a CRC value and compares the calculated CRC value to a received CRC value. The received CRC value is one which is initially received by CPU 300 and is transmitted through exclusive OR circuit 308 onto line 332 for receipt by logic device 328. If logic device 328 determines that the calculated and received CRC values match, it produces a signal reflecting a "pass" on line 336. It also transmits the received data frame to CPU 300. If the CRC values do not match each other, logic device 328 produces a signal on line 336 reflecting a "fail". Once CPU 300 receives a "pass" signal from logic device 328, it outputs the data frame received from logic device 328 on primary data channel 340. Because CPU 300 also knows what mask pattern was combined with the data frame in exclusive OR circuit 308, it can reconstruct the data input pattern represented by the mask and can output the same on line 344. Effectively, therefore, lines 340 and 344 define the primary data channel and secondary data channel, respectively.

If however, CPU 300 receives a "fail" signal on line 336, it sends control signals on line 320 to logic device 316 which cause logic device 316 to transmit a mask pattern to exclusive OR circuit 308. CPU 300 retransmits the received data frame 302 on line 312 to exclusive OR circuit 308 and logic device 324 transmits a mask pattern on line 324. Exclusive OR circuit 308 logically combines the two inputs and outputs the result on line 332. As described earlier, logic device 328 receives the output from exclusive OR circuit 308 and determines whether the calculated CRC value and the received CRC values match. Logic device 328 then generates a "pass" or a "fail", accordingly. This process of trying various masks selected from the store is continued by CPU 300 until either a pass is received, or until the data frame received on line 304 has been logically combined with every mask stored within logic device 316. If a pass signal is not received, after all masks have been combined with data frame 302, CPU 300 concludes that a transmission error has occurred. Once a "pass" is received, CPU 30 outputs the reconstructed primary signal on line 340 and the data bit pattern on line 344. The data bit pattern is the signal pattern for which a selected mask was combined with the primary signal.

Figure 4:
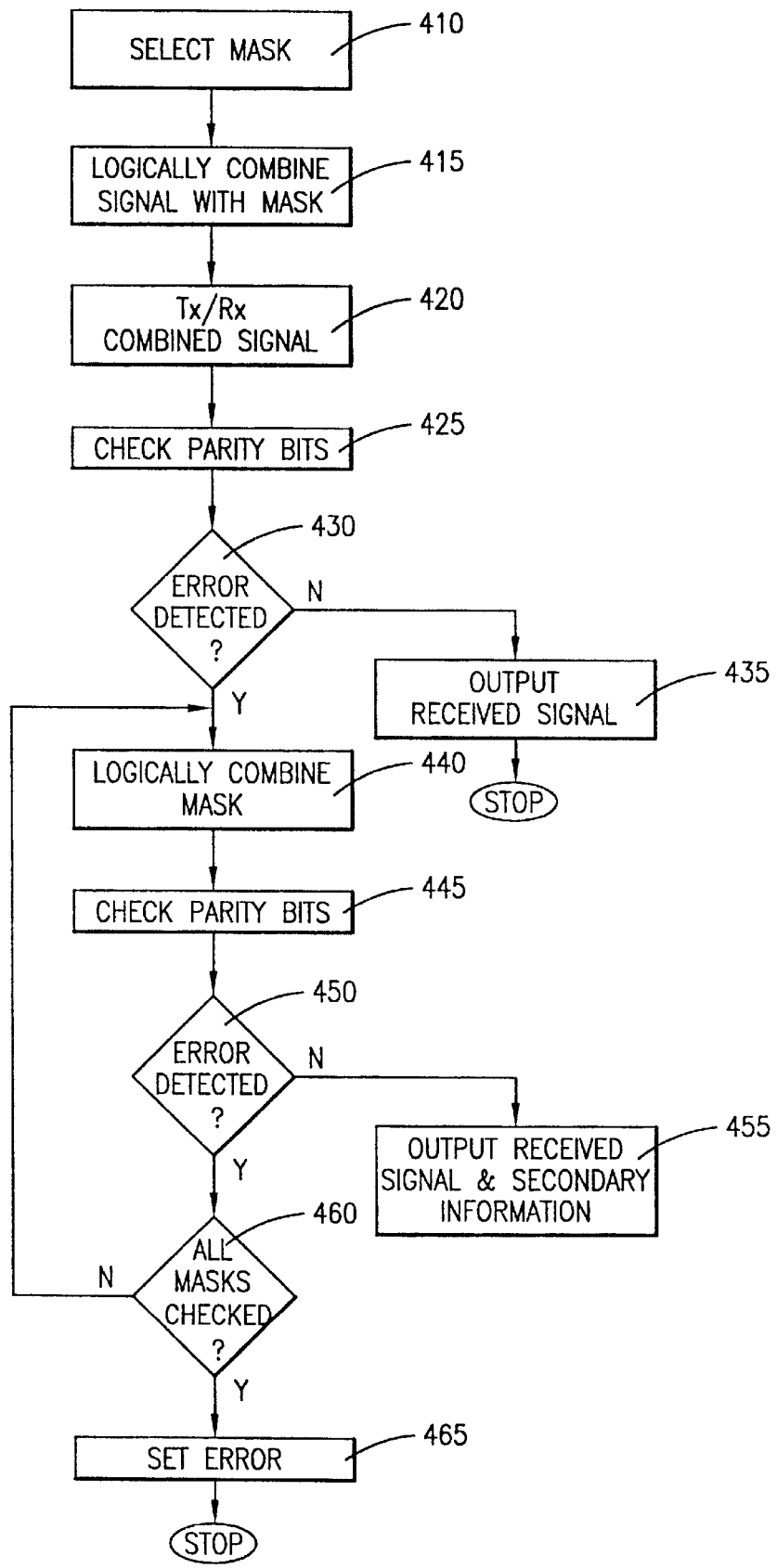
FIG. 4 is a flowchart illustrating a preferred embodiment of the inventive method.

FIG. 4 is a flow diagram illustrating a method for creating two logical channels over one physical channel in accordance with the preferred embodiment of the present invention. At the first step, error protection encoder 112 of FIG. 1 selects a mask which is to be combined with an encoded signal (Step 410). In general, a mask is selected by error protection encoder 112 in FIG. 1, based upon the logic state of an input signal, or a specified internal signal which is to be conveyed along with an encoded input signal. A mask store error protection encoder 112 contains at least one mask. Moreover, the mask store contains at least one mask for every specified piece of information or control signal which is to be conveyed. The encoded input signal is then logically combined with the selected mask (Step 415). In the preferred embodiment, the encoded signal and the mask are logically combined through an exclusive OR operation. Thereafter, the logically combined signal is transmitted by RF modulator 128 and received by RF demodulator 136 in FIG. 1 (Step 420).

Upon receiving the signal from RF modulator 128, RF demodulator transmits a demodulated signal to error protection decoder 140. Error protection decoder 140 calculates parity bits for the received signal and compares them to the received parity bits (Step 425). Error protection decoder 140 then determines whether the calculated and received parity bits match each other (Step 430). If they match (no error is detected), then the received signal is output by error protection decoder 140 to source decoder 152 (Step 435). If there is not a match (an error or an induced violation is detected) in Step 430, then a mask is selected and logically combined with the received and the demodulated signal within the error protection decoder 140. As described above, in the preferred embodiment, the received and demodulated signal is logically combined with a mask by the exclusive OR function (Step 440). If the same mask is combined by the exclusive OR function first with an encoded signal and then with the product of the mask and the encoded signal, the net result is the primary signal (the originally encoded signal). Thus, the originally encoded signal is recreated. Once that happens, the calculated and received parity bits should equal each other. Next, parity bits are calculated again for the received signal and compared to the received error code (Step 445). Once the two sets of parity bits are compared, error protection decoder 140 determines whether the values match each other (Step 450). If so, decoder 140 can conclude that no error was detected and accordingly outputs the received signal and the secondary information represented by the mask (Step 455). At this point, the encoded signal which was originally combined with a mask has been recreated. Additionally, error protection decoder 140 now knows what mask was used to recreate the signal. Because error protection decoder 140 knows what mask was used to recreate the signal, it can determine the secondary information that was conveyed along with the encoded signal over the primary channel. The reason for this conclusion is that each mask represents a specified event or data pattern.

On the other hand, at Step 450, if the calculated and received parity bits do not match each other, decoder 140 determines whether all masks have been logically combined with the received signal (Step 460). If one or more of the masks have not been logically combined with the demodulated signal, one of the untried masks is selected and Steps 440 through 460 are repeated. However, if all of the masks have been combined with the demodulated signal and the calculated and received parity bits do not match, then transmission error has occurred. Accordingly, error protection decoder 140 concludes that an error has occurred and responds accordingly (Step 465). By way of example, error protection decoder 140 can implicitly signal RF modulator 128 to request another transmission attempt by means of well known ARQ techniques.

Figure 5:
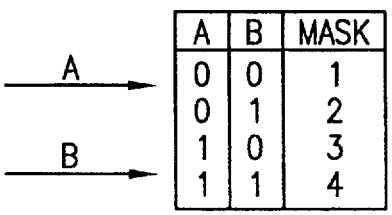
FIG. 5 is a table illustrating an embodiment of the inventive method for selecting a mask based upon a logic state of a set of discrete inputs.

FIG. 5 is a table which illustrates with more specificity, the method of selecting a mask of Step 410 of FIG. 4. Referring to FIG. 5, the table in FIG. 5 includes three columns. One column reflects the logic state of an input A, a second column represents the logic state of an input B, and a third column represents which stored mask is to be used for the various combinations of the A and B inputs. For example, the input lines A and B may be used to select which mask is logically combined with an input signal. At the receiving end, within error protection decoder 140, an equivalent set of masks are stored therein. Accordingly, if the input signals for A and B are zero and one, respectively, then mask no. 2 is the mask which is selected and logically combined with the input signal. Accordingly, when error protection decoder 140 of FIG. 1 logically combines mask 2 with the received signal from RF-demodulator 136, the calculated and received parity bits match each other. Because error protection decoder 140 has determined that it was mask 2 which was used to recreate the original encoded signal, it also knows the secondary information which is being conveyed along with the primary signals. With respect to a system which is represented by the table of FIG. 5, in accordance with the present invention, the data bit pattern being transmitted over the second logical channel is equal to an "01" bit pattern for the A and B input lines. As shown therefore, information from two sources can be transmitted over one physical channel thereby reducing the number of physical channels required for communications.

Although an embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. In particular, although the present invention has been described in the context of a wireless communication system, it will be evident to those skilled in the art once having been taught the present invention that the present invention is equally applicable to wireline communication systems as well as wireless.

Further, the foregoing apparatus can equivalently be embodied within programming for a microprocessor or a digital signal processor.

What is claimed is:

1. A communication system for transmitting a plurality of logical channels over a single physical channel, comprising:
   an error protection encoder for generating at least one parity bits for attachment to a first data signal;
   a mask selector for generating a selected mask in response to signal at least one input second data signal, said selected mask representing data within the selected data;
   a logic circuit connected to receive an error protection encoded signal from said error protection encoder and connected to receive said selected mask from said mask selector, said logic circuit for combining the error protection encoded signal and the selected mask to produce a frame of data containing both the first and second data signals; and an error protection decoder coupled to receive said frame of data, said error protection decoder for producing a first and a second output signals, said first output signal being substantially similar to said first data signal received by said error protection encoder, and said second output signal representing said second data signal received by the mask selector.

2. The communication system of claim 1 wherein the error protection encoder comprises a CRC encoder for generating CRC parity bits.

3. The communication system of claim 2 wherein the logic circuit comprises circuitry for performing an exclusive OR function to combine the error protection encoded signal and the selected mask.

4. An error protection encoder, comprising:

a processor arranged to receive a primary signal;

a first logic device connected to receive said primary signal from said processor, said first logic device operating to generate and append parity bits;

a second logic device connected to receive a secondary data signal from said processor, said second logic device operable to select and output a mask based upon said secondary data signal; and a logic circuit coupled to receive an output of said first and second logic device, said logic circuit operable to combine said first and second outputs received from said first and second logic devices, to produce a data frame.

5. The error protection of claim 4 wherein the logic circuit is comprised of circuitry for performing an exclusive OR function.

6. An error protection decoder, comprising:

a CPU operable to receive a frame of data;

a first logic device operable to receive a control signal from said CPU, and to select and output a mask associated with said control signal;

a logic circuit operable to receive said frame of data from said CPU and to combine an input signal from said CPU and the selected mask from said first logic device and produce a combined output; and a second logic device operable to receive said output of said logic circuit and calculate parity bits for comparing with received parity bits of the combined output, said second logic device further operable to transmit a signal to said CPU indicating whether said calculated and received parity bits match.

7. The error protection decoder of claim 6 wherein the logic circuit comprises circuitry for performing an exclusive OR function.

8. A method for transmitting information from a first logical channel and a second logical channel on one physical channel, comprising the steps of:

error encoding a first data signal associated with the first logical channel;

selecting a mask defining a second data signal associated with the second logical channel;

combining the error encoded first data signal with said mask to form a combined signal;

transmitting and receiving said combined signal;

combining a mask having a second data signal associated therewith from a plurality of masks with said received signal to form a multiply-combined signal;

detecting whether a violation of an error control code is present within the multiply-combined signal;

outputting the second data signal associated with said mask used to form said multiply-combined signal and the multiply-combined signal as the first data signal, if no violation has been detected.

9. The method of claim 8 further comprising the steps of:

determining if each mask of the plurality of mask has been logically combined with said combined signal; and repeating said steps of combining said mask and detecting error codes until no violation is detected or said last of each said plurality of mask has been combined with said combined signal.

10. The method of claim 9 further comprising the step of:

setting an error condition if each mask of the plurality of masks has been combined with said combined signal, and a violation has been detected.

11. An error protection decoder for processing a received frame of data, comprising:

a CPU for receiving a frame of data, said frame of data including a first data signal and a second data signal;

a first logic device responsive to a control signal from the CPU for selecting one of a plurality of masks, each of the plurality of masks associated with a particular piece of data;

a logic circuit for combing the received frame of data from the CPU with the selected mask to produce a combined signal; and a second logic device for calculating parity bits for the combined signal and for comparing the calculated parity bits with parity bits included with the combined signal to determine if the match; and processing means responsive to a matching determination by the second logic device for outputting the combined signal as a first data signal and for computing a second data signal associated with the selected mask.

* * * * *

UNITED STATES PATENT AND TRADEMARK OFFICE
CERTIFICATE OF CORRECTION

PATENT NO. : 5,862,160
DATED : January 19, 1999
INVENTOR(S) : Irvin et al.

It is certified that error appears in the above-indentified patent and that said Letters Patent is hereby corrected as shown below:

Column 3, line 44   Replace "XoRed"
With -XORed--

Column 5, line 18   Replace "protein"
With -protection--

Column 5, line 41   Replace "party"
With -- parity--

Signed and Sealed this

First Day of May, 2001

Attest:

NICHOLAS P. GODICI

*Attesting Officer*   *Acting Director of the United States Patent and Trademark Office*